US012764686B2

(12) United States Patent
Mysore et al.

(10) Patent No.: US 12,764,686 B2
(45) Date of Patent: Oct. 13, 2026

(54) LATENCY IMPROVEMENTS FOR GAMING HIDS

(71) Applicant: Cypress Semiconductor Corporation, San Jose, CA (US)

(72) Inventors: Manamohan Mysore, Ramona, CA (US); Arvind Sridharan, San Diego, CA (US); Victor Zhodzishsky, Potomac, CA (US)

(73) Assignee: Infineon Technologies Americas Corp., El Segundo, CA (US)

( * ) Notice: Subject to any disclaimer, the term of this patent is extended or adjusted under 35 U.S.C. 154(b) by 392 days.

(21) Appl. No.: 18/477,809

(22) Filed: Sep. 29, 2023

(65) Prior Publication Data

US 2025/0113314 A1 Apr. 3, 2025

(51) Int. Cl.
*H04W 56/00* (2009.01)

(52) U.S. Cl.
CPC ................................ *H04W 56/0015* (2013.01)

(58) Field of Classification Search
CPC ......................... H04W 56/0015; H04W 56/001
USPC ........................................................... 370/329
See application file for complete search history.

(56) References Cited

U.S. PATENT DOCUMENTS

2024/0056207 A1* 2/2024 Xu ......................... H04H 20/88
2024/0236887 A1* 7/2024 Liu ................... H04W 56/0015
2024/0276304 A1* 8/2024 Rangineni ............. H04W 28/18
2024/0397455 A1* 11/2024 Bamidi ................. H04W 48/10
2024/0397509 A1* 11/2024 Robin ................... H04W 8/005
2024/0406937 A1* 12/2024 Robin ................. H04W 56/001
2024/0430914 A1* 12/2024 Xu .................... H04W 72/0446
2025/0016745 A1* 1/2025 Xu .......................... H04W 4/80
2025/0081035 A1* 3/2025 Sangwan ............ H04W 28/065
2025/0088381 A1* 3/2025 Gao .................. H04W 72/0446
2025/0227133 A1* 7/2025 Yoon ....................... H04W 4/80

* cited by examiner

*Primary Examiner* — Robert J Lopata

(57) ABSTRACT

Disclosed are techniques to use existing BLE broadcast-based signaling protocols to achieve sub-1 ms peripheral-to-central latency even when multiple peripheral devices share the air-time. The techniques adapt existing BLE advertising or broadcast signaling protocols to efficiently allocate air-time to support frequent peripheral-to-central transmissions that are relatively short in duration and less frequent central-to-peripheral transmissions. A broadcast isochronous group (BIG) protocol may be used to reduce peripheral-to-central latency by aggregating broadcast isochronous streams (BIS) from peripheral devices into a BIG. A one-to-many broadcast event that may carry other broadcast data from the central device to the peripheral devices may be used for time synchronization by the peripheral devices and to configure time parameters of broadcast from the peripheral devices. A reverse many-to-one broadcast from the peripheral devices to the central device may be based on the time parameters. The techniques yield low peripheral-to-central latency and natively support encryption in a BLE controller.

20 Claims, 8 Drawing Sheets

LATENCY IMPROVEMENTS FOR GAMING HIDS

TECHNICAL FIELD

This disclosure generally relates to technologies for establishing connections between devices using narrow-band radios such as Bluetooth wireless technologies, and more particularly, to methods and systems for connected peripherals such as human interface devices (HIDs) in gaming or user devices in other applications to communicate with a central device of a Bluetooth Classic or Bluetooth Low Energy (LE) network with low latency.

BACKGROUND

In a Bluetooth Classic or Bluetooth LE network, one or more human interface devices (HIDs) may be connected as peripherals to a central device of the network. For example, in gaming or virtual reality applications, gaming controllers manipulated by users or virtual reality (VR) headsets worn by users are connected to a gaming or VR console acting as the central device. The controllers or headsets may transmit user input, positional data, or other user interface information to the central device. The central device may process the user information to generate audio/visual/tactile feedback data to the users. To provide a more immersive user experience, it is desirable to keep the communication latency (e.g., delay between when data is available for transmission and the actual time of transmission) from the peripheral devices to the central device as low as possible. For example, system performance requirements in gaming/VR applications generally demand an average peripheral-to-central latency of <1 ms per peripheral. This may translate into <1 ms when only 1 peripheral device is connected to the central device, <2 ms when 2 peripheral devices are connected to the central device, <4 ms when 4 peripheral devices are connected to the central device, etc. While link layer solution such as connected isochronous stream may be considered as a solution to reduce latency in peripheral-to-central communication, it has inherent limitations due to its high air-time overhead for central-to-peripheral communication that reduces the percentage of air-time available for peripheral-to central communication. The drawback may become more pronounced as the number of peripherals connected to a central device increases. It is advantageous to explore other ways to leverage existing Bluetooth compliant protocol to achieve low latency for peripheral-to-central communication.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
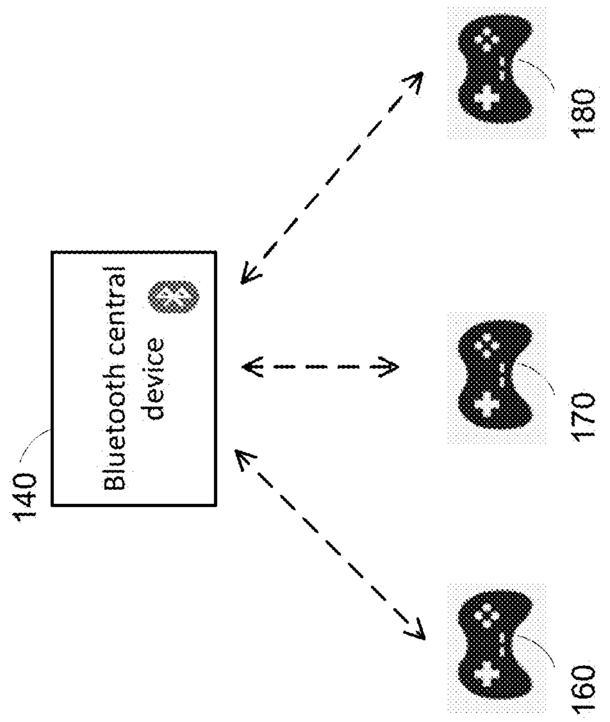
FIG. 1 depicts a scenario of several HIDs communicating with a central device of a BLE network in which it is desirable to reduce the communication latency from any one HID to the central device in accordance with one aspect of the present disclosure.

Examples of various aspects and variations of the subject technology are described herein and illustrated in the accompanying drawings. The following description is not intended to limit the invention to these embodiments, but rather to enable a person skilled in the art to make and use this invention.

In Bluetooth LE (BLE), a central device plays the role of the master to control the timing and channels of communication with a connected peripheral device. A device that wishes to become a peripheral device may discover and initiate a connection with the central device using advertising channels in the frequency band (e.g., 2.4 GHz ISM). After the pair of devices enter a connection state in the link layer, the central device may time-multiplex communication between the central and the connected peripheral device with that of other connected peripheral devices. In many timing-critical applications using BLE, including gaming, virtual reality, automotive, etc., it is important to keep the communication latency from the peripheral devices to the central device as low as possible. For example, when a user wearing a VR headset turns to a new object in a scene, the VR headset may send the new VR headset positional data to a gaming console for the gaming console to re-orient the object in the scene. To provide a lag-free and immersive user experience, it is desirable to keep under 1 ms the average latency from the time when the VR headset updates the positional data to the start of transmission of the updated positional data to the gaming console. However, as the number of peripheral devices connected to the central device increases, the 1 ms peripheral-to-central latency target becomes harder to achieve due to time-sharing of the air resources between the peripheral devices.

To reduce the peripheral-to-central latency, a signaling protocol that seeks to minimize air-time from the central device to the peripheral device(s) and to maximize air-time from the peripheral device(s) to the central device may be used. BLE connected isochronous stream (CIS) is a point-to-point bidirectional communication protocol that allows a central device and a peripheral device to exchange data packets using connected isochronous protocol data units (PDUs). A CIS event may be divided into multiple sub-intervals for a central device to communicate with a separate peripheral device in each sub-interval. However, CIS events do not prioritize peripheral-to-central communication due to high air-time overhead for central-to-peripheral communication. For example, central-to-peripheral transmission and the inter-frame spacing between the central-to-peripheral transmission and a peripheral-to-central transmission within a sub-interval may occupy a relatively high percentage of air-time even if central-to-peripheral communication infrequently occurs. A peripheral device may respond only when the central device has polled for it. In addition, an asynchronous connection-oriented logical (ACL) connection is presupposed for CIS so that a CIS event may need to yield to an ACL event if there is a collision. As such, CIS may not be able to achieve better than 1 ms average peripheral-to-central latency per peripheral device (e.g., <1 ms when only 1 peripheral device is connected to the central device, <2 ms when 2 peripheral devices are connected to the central device, <4 ms when 4 peripheral devices are connected to the central device).

Disclosed are techniques to use existing BLE broadcast-based signaling protocols to achieve sub-1 ms peripheral-to-central latency even when multiple peripheral devices share the air-time (e.g., <1 ms even when 4 peripheral devices are connected to the central device). The techniques adapt existing BLE advertising or broadcast signaling protocols that do not require frequent central-to-peripheral transmissions to more efficiently allocate air-time to support more frequent peripheral-to-central transmissions that are relatively short in duration. The allocation of air-time between central-to-peripheral one-to-many communication and peripheral-to-central many-to-one communication may be tuned with a fine granularity according to the use case. Advantageously, the techniques achieve close-to-ideal air-time utilization to yield much lower peripheral-to-central latency than existing solutions, are compliant with BLE protocols, and may natively support encryption in a BLE controller.

FIG. 1 depicts a scenario of several human interface devices (HIDs) communicating with a central device 140 of a BLE network in which it is desirable to reduce the communication latency from any one HID to the central device in accordance with one aspect of the present disclosure. The HIDs may be gaming controllers 160, 170, and 180 that are connected as peripheral devices to a gaming console acting as the central device 140. In general, the HIDs may be any user input/output devices such as virtual reality devices, keyboards, mouse pads, etc. While FIG. 1 illustrates aspects of the disclosure in a gaming context, the demand for low peripheral-to-central latency is not so limited and may encompass applications in automotive, industrial, manufacturing, or other timing-critical environments.

The gaming controllers 160, 170, 180 may capture commands from users and may compete for air-time to transmit PDUs encapsulating the captured commands to the central device 140. In response, the central device 140 may process the received commands to generate feedback such as audio/visual/tactile data for transmission to the users. As the number of peripheral devices competing for air-time increases, the latency from the time when the PDUs are ready for transmission and the time of actual transmission from a gaming controller after the gaming controller has gained access to the air-time concomitantly increases. A gaming application may specify the average peripheral-to-central latency to account for the number of connected peripherals. For example, for a central device with N connected peripherals, the average peripheral-to-central latency may be specified as no more than N ms. However, this kind of latency number may represent just the bare minimal requirement. To meet higher user expectation, it is desired to maintain the average peripheral-to-central latency below 1 ms even when there are multiple connected peripherals.

Figure 2:
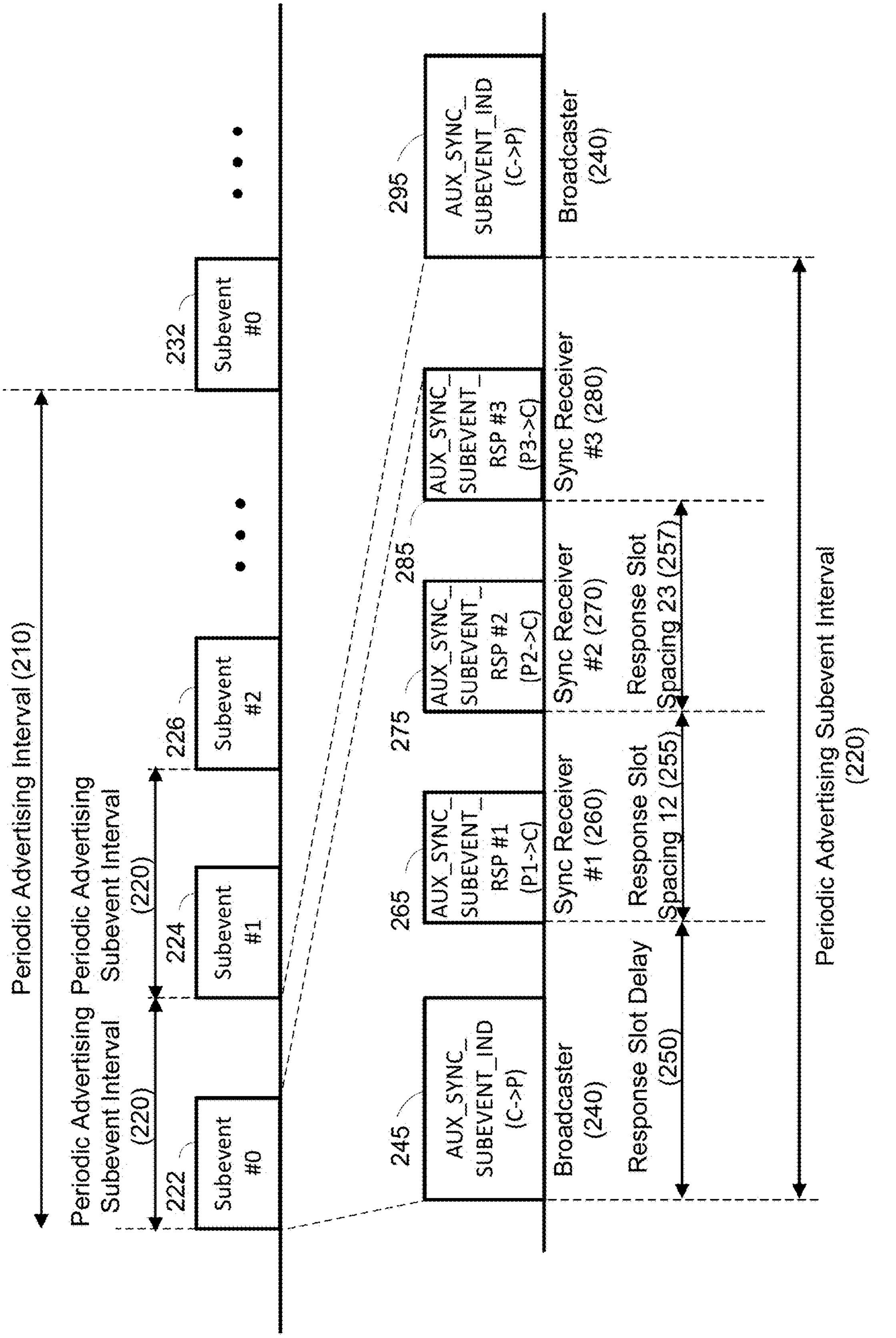
FIG. 2 illustrates a mechanism for using the periodic advertising with response (PAwR) protocol in BLE to reduce peripheral-to-central latency in accordance with one aspect of the present disclosure.

FIG. 2 illustrates a mechanism for using the periodic advertising with response (PAwR) protocol in BLE to reduce peripheral-to-central latency in accordance with one aspect of the present disclosure. PAwR protocol is a fixed-interval broadcast-based protocol that supports one-to-many bidirectional communication. The PAwR protocol may be implemented in the BLE network of FIG. 1.

In PAwR, advertising packets are transmitted not just on advertising channels 37, 38, and 39, but also on other channels. For example, extended advertising (ADV_EXT_IND) packets, which are transmit on advertising channels 37, 38, and 39, may point to auxiliary advertising (AUX_ADV_IND) packets, which are transmitted on channels other than 37, 38, and 39. The auxiliary advertising packets may in turn point to periodic advertising packets that are transmitted on other channels to announce the broadcast. Transmission events are divided into periodic advertising intervals (210). A periodic advertising interval 210 may be further divided into periodic advertising subevent intervals (220). Within each periodic advertising subevent interval 220 is a subevent. FIG. 2 depicts subevent #0 (222), subevent #1 (224), subevent #2 (226), etc., corresponding to a number of periodic advertising subevent intervals (220).

A subevent may include a central-to-peripheral advertising broadcast event 240, referred to as an auxiliary synchronized subevent indication 245/295 (AUX_SYNC_SUBEVENT_IND) at the start of each periodic advertising subevent interval 220 followed by responses from synchronized receivers. Peripheral devices may synchronize their timing to the central device 140 based on the central-to-peripheral broadcast event 240, which may call out which peripheral devices are to respond. After a configured response slot delay 250 measured from the start of the periodic advertising subevent interval 220, a first synchronized peripheral device 260 may transmit to the central device 140 an auxiliary synchronized subevent response 265 (AUX_SYNC_SUBEVENT_RSP #1) representing a peripheral-to-central transmission from the peripheral device 260.

Responses from peripheral devices within a subevent may be separated by a configured response slot spacing. For example, the auxiliary synchronized subevent response 265 from the first synchronized peripheral device 260 and the auxiliary synchronized subevent response 275 (AUX_SYNC_SUBEVENT_RSP #2) from a second synchronized peripheral device 270 may be separated by a response slot spacing 12 (255). The auxiliary synchronized subevent response 275 from the second synchronized peripheral device 270 and the auxiliary synchronized sub-event response 285 (AUX_SYNC_SUBEVENT_RSP #3) from a third synchronized peripheral device 280 may be separated by a response slot spacing 23 (257).

While the PAwR protocol reduces overhead for central-to-peripheral air-time compared to the CIS protocol and allows some control to prioritize peripheral-to-central transmission over central-to-peripheral transmission, it has inherent limitations that make it less than ideal for supporting very low peripheral-to-central latency in HID applications. For example, the subevent interval 220 and hence the peripheral-to-central latency is configured in increments of 1.25 ms. In addition, the response slot delay 250 is configured in increments of 1.25 ms, the response slot spacing is configured in increments of 0.125 ms, and the gap (e.g., inter-frame spacing time or T_IFS) between any two adjacent packets in the PAwR train of advertising broadcast event 240 and responses from the peripheral devices are to be separated by at least 0.150 ms. Thus, the allocation of air-time between central-to-peripheral transmissions and peripheral-to-central transmissions may not be sufficiently granular to support an average peripheral-to-central latency of less than 1 ms across a wide numerical range of connected peripherals. Encryption is also not natively supported in a controller of the central device 140 and are handled by the host. The host is also involved in tracking peripheral-specific states and is part of the reason that the response slot delay 250 is in multiple of 1.25 ms. An alternative protocol with finer granular customization of the air-time for peripheral-to-central transmissions and native support for encryption in the controller is desired.

Figure 3:
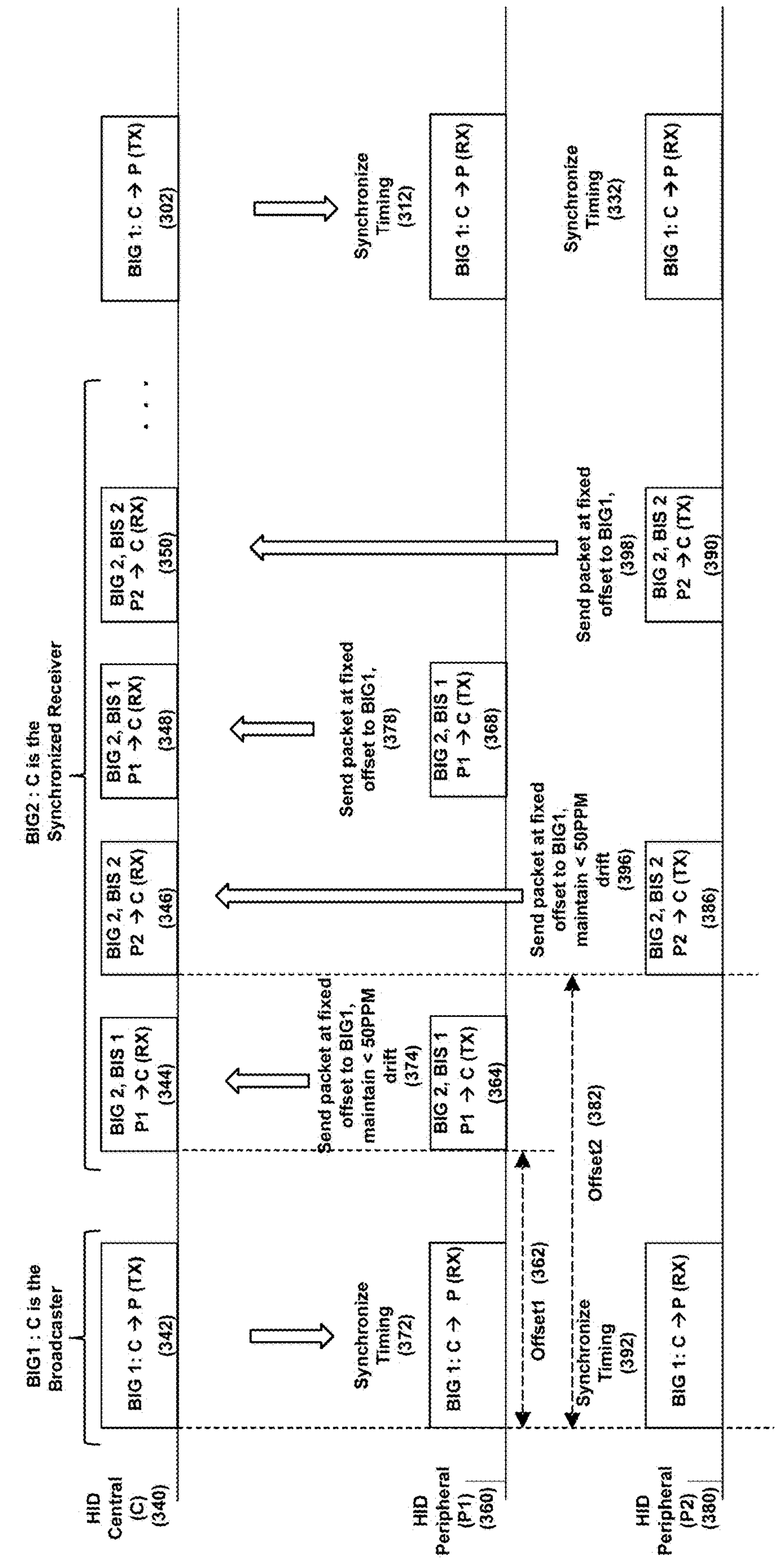
FIG. 3 illustrates a mechanism for using a broadcast isochronous group (BIG) to reduce peripheral-to-central latency by aggregating broadcast isochronous streams (BIS) from peripheral devices into a BIG to transmit low-latency peripheral-to-central data in accordance with one aspect of the present disclosure.

FIG. 3 illustrates a mechanism for using a broadcast isochronous group (BIG) to reduce peripheral-to-central latency by aggregating broadcast isochronous streams (BIS) from peripheral devices into a BIG to transmit low-latency peripheral-to-central data in accordance with one aspect of the present disclosure. A device assuming the role of an isochronous broadcaster may create a BIG to transport one-to-many data transportation stream without acknowledgement. The air-time may be divided into two broadcast events: a one-to-many broadcast event from the central device 340 to the peripheral devices 360/380, and a reverse many-to-one broadcast from the peripheral devices 360/380 to the central device 340. The broadcast events may be implemented in the BLE network of FIG. 1.

The broadcast event 342 from the central device 340 may be a periodic BIG event, referred to as BIG1, for the central device 340 to broadcast a BIS to synchronized peripheral devices 360/380 to coordinate the peripheral-to-central transmissions. In one embodiment, instead of an isochronous broadcast, the central device 340 may transmit a periodic advertising event (PAdv) (also called an advertising extension). In one embodiment, instead of a broadcast or advertising event, the central device 340 may establish a LE connection with the peripheral devices 360/380. However, for purpose of reducing overhead for central-to-peripheral transmission and enabling low-latency peripheral-to-central transmission, a broadcast-based protocol such as BIG or PAdv is preferred for coordinating the peripheral-to-central transmissions.

The periodic broadcast event 342 may contain profile messaging to configure packet sizes and parameterized sub-intervals of the peripheral-to-central transmissions. The periodic broadcast event 342 may contain broadcast data used by the peripheral devices for other purposes. Peripheral device HID peripheral P1 (360) may receive the periodic broadcast event 342 to synchronize its timing 372 to the central device 340 and to infer one or more fixed offsets (e.g., offset1 (362)) from the broadcast event 342 when it is instructed to start its peripheral-to-central transmission(s). Similarly, peripheral device HID peripheral P2 (380) may receive the periodic broadcast event 342 to synchronize its timing 392 to the central device 340 and to infer one or more offsets (e.g., offset2 (382)) from the broadcast event 342 when it is instructed to start its peripheral-to-central transmission(s).

At the instructed offsets from the broadcast event 342, the peripheral devices 360/380 take their turns transmitting to the central device by broadcasting non-overlapping BISes in a role reversal of BIG1. The reverse broadcast events where the peripheral devices 360/380 take their turns assuming the role of the isochronous broadcaster and the central device 340 becomes the synchronized receiver is collectively referred to as BIG2. After synchronizing their timing based on the periodic broadcast event of BIG1, the peripheral devices 360/380 may maintain a clock drift of less than 50 ppm during BIG2 to prevent excessive time misalignment between the peripheral devices 360/380 and the central device 340.

FIG. 3 shows that at offset1 (362) from the start of BIG1, HID peripheral P1 (360) may broadcast BIS1 (364) to transmit a first packet 374. The central device 340 may receive BIS1 (364) during sub-interval 344 of BIG2. At offset2 (382) from the start of BIG1, HID peripheral P2 (380) may broadcast BIS2 (386) to transmit a first packet 396. The central device 340 may receive BIS2 (386) during sub-interval 346 of BIG2. The BISes from the peripheral devices 360/380 may be interleaved so that following BIS2 (386) from HID peripheral P2 (380), HID peripheral P1 (360) may broadcast BIS1 (368) to transmit a second packet 378 at another offset from BIG1. The central device 340 may receive BIS1 (368) during sub-interval 348 of BIG2. Subsequently, HID peripheral P2 (380) may broadcast BIS2 (390) to transmit a second packet 398. The central device 340 may receive BIS2 (390) during sub-interval 350 of BIG2. The peripheral devices 360/380 may continue to interleave their BISes until the end of BIG2. In one embodiment, the peripheral devices 360/380 may broadcast their BISes in a sequential manner so that a peripheral device may complete all its transmissions in a BIS before the next peripheral device takes its turn.

At the next periodic BIG1 event 302, the central device 340 may broadcast a BIS containing profile messaging to configure the packet sizes and parameterized sub-intervals of the peripheral-to-central transmissions of the next BIG2. HID peripheral P1 (360) may receive the BIG1 event 302 to synchronize its timing 312 anew and to infer the next offset(s) for starting its peripheral-to-central transmission(s). Similarly, HID peripheral P2 (380) may receive the BIG1 event 302 to synchronize its timing 332 and to infer its next offset(s) for starting its peripheral-to-central transmission(s).

As shown, the BISes from the peripheral devices 360/380 are aggregated or coalesced to form BIG2 in a reverse many-to-one broadcast, also referred to as BIG in reverse. Advantageously, the peripheral devices 360/380 do not need to perform extended advertising and periodic advertising to announce the BIS broadcast. The peripheral devices 360/380 may infer the timing of BIG2 from BIG1 and the information shared in the periodic broadcast events. The BIG in reverse protocol achieves close to ideal air-time utilization and reduced peripheral-to-central latency than other techniques because the subevent timing for the BIG events may be measured in microseconds, allowing fine-grain control of the air-time for the peripheral-to-central transmissions. Data bandwidth in either direction is also easily customizable. In addition, it has native support for encryption in the controller and is standard compliant, eliminating the need for any low-level protocol changes.

Figure 4:
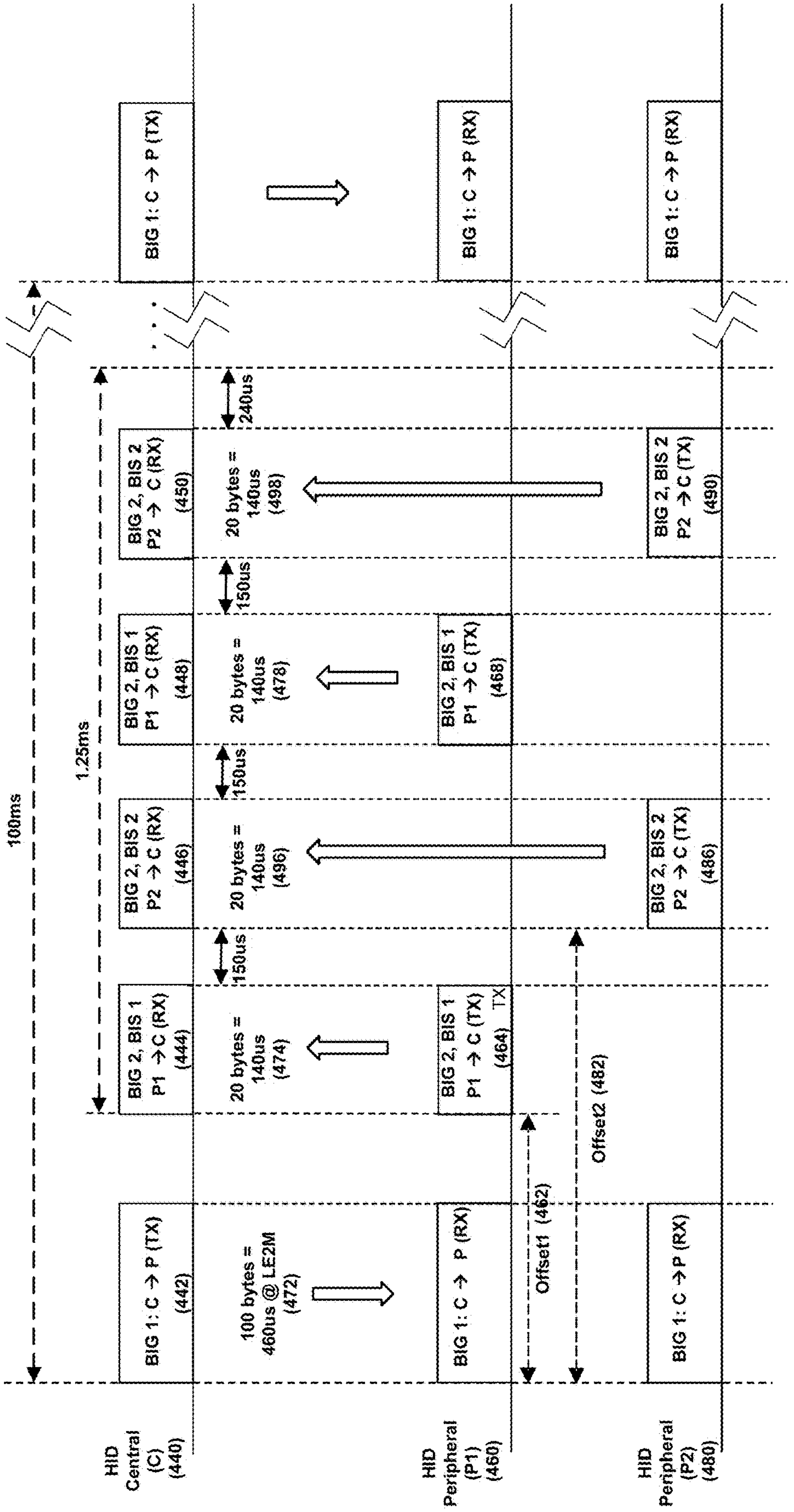
FIG. 4 illustrates an example of using periodic BIG events to broadcast infrequent data from a central device to two peripheral devices every 100 ms and using BIS events of a second BIG to collectively broadcast data from the peripheral devices to the central device during the remaining air-time of the 100 ms interval to achieve low-latency peripheral to-central communication in accordance with one aspect of the present disclosure.

FIG. 4 illustrates an example of using periodic BIG events to broadcast infrequent data from a central device 440 to two peripheral devices 460/480 every 100 ms and using BIS events of a second BIG to collectively broadcast data from the peripheral devices 460/480 to the central device 440 during the remaining air-time of the 100 ms interval to achieve low-latency peripheral to-central communication in accordance with one aspect of the present disclosure. The parameters for the data bandwidth are 100 bytes of central-to-peripheral data every 100 ms and 20 bytes of peripheral-to-central data with as low a latency as possible.

At the start of the 100 ms period, the central device 440 may broadcast a BIS 472 of 100 bytes in a BIG1 event 442. The BIG1 event 442 may have a duration of about 460 us assuming LE2M bit rate. Peripheral device HID peripheral P1 (460) may receive BIS 472 to synchronize its timing to the central device 440 and to infer a fixed offset (offset1 (462)) from the start of the BIG1 event 442 when it is instructed to start its peripheral-to-central transmission. Similarly, HID peripheral P2 (480) may receive BIS 472 to synchronize its timing to the central device 440 and to infer an offset (offset2 (482)) from the start of the BIG1 event 442 when it is instructed to start its peripheral-to-central transmission. The central device 440 may configure a suitable inter-frame spacing (e.g., 150 us) between the end of the BIG1 event 442 and the start of the BIG2 event to satisfy a minimum T_IFS between BIG1 and BIG2 events.

At offset1 (462) from the start of the BIG1 event 442, HID peripheral P1 (460) may broadcast BIS1 (464) to transmit a first packet 474 of 20 bytes. The BIS1 (464) may have a duration of about 140 uS. The central device 440 may receive BIS1 (464) during sub-interval 444 of BIG2. At offset2 (482) from the start of the BIG1 event 442, HID peripheral P2 (480) may broadcast BIS2 (486) to transmit a first packet 496 of 20 bytes. There may be a spacing of 150 us between consecutive BISes to satisfy a minimum T-IFS between subevent slots. The BIS2 (486) may also have a duration of about 140 uS. The central device 440 may receive BIS2 (486) during sub-interval 446 of BIG2.

The BISes from the peripheral devices 460/480 may be interleaved so that 150 us after the end of BIS2 (486), HID peripheral P1 (460) may broadcast BIS1 (468) to transmit a second packet 478. The central device 440 may receive BIS1 (468) during sub-interval 448 of BIG2. Subsequently, HID peripheral P2 (480) may broadcast BIS2 (490) to transmit a second packet 498. The central device 440 may receive BIS2 (490) during sub-interval 450 of BIG2. There may be a spacing of 240 us between BIS2 (490) and the next BIS. Thus, HID peripheral P1 (460) and, HID peripheral P2 (480) each have two opportunities to transmit packets almost every 1.25 ms. The 1.25 ms cycle of BIG2 may repeat for the remainder of the 100 ms period.

For calculating the average latency of peripheral-to-central transmissions, if it is assumed that on average the data packets are generated at the midpoint between two consecutive BIS transmissions of BIG2, the expected latency may be expected to be half of the duration of the two transmissions. Averaging the expected latency over the 100 ms period of the BIG1/BIG2 events, the average peripheral-to-central latency may be about 0.3 ms, well within the target latency of 1 ms.

Figure 5:
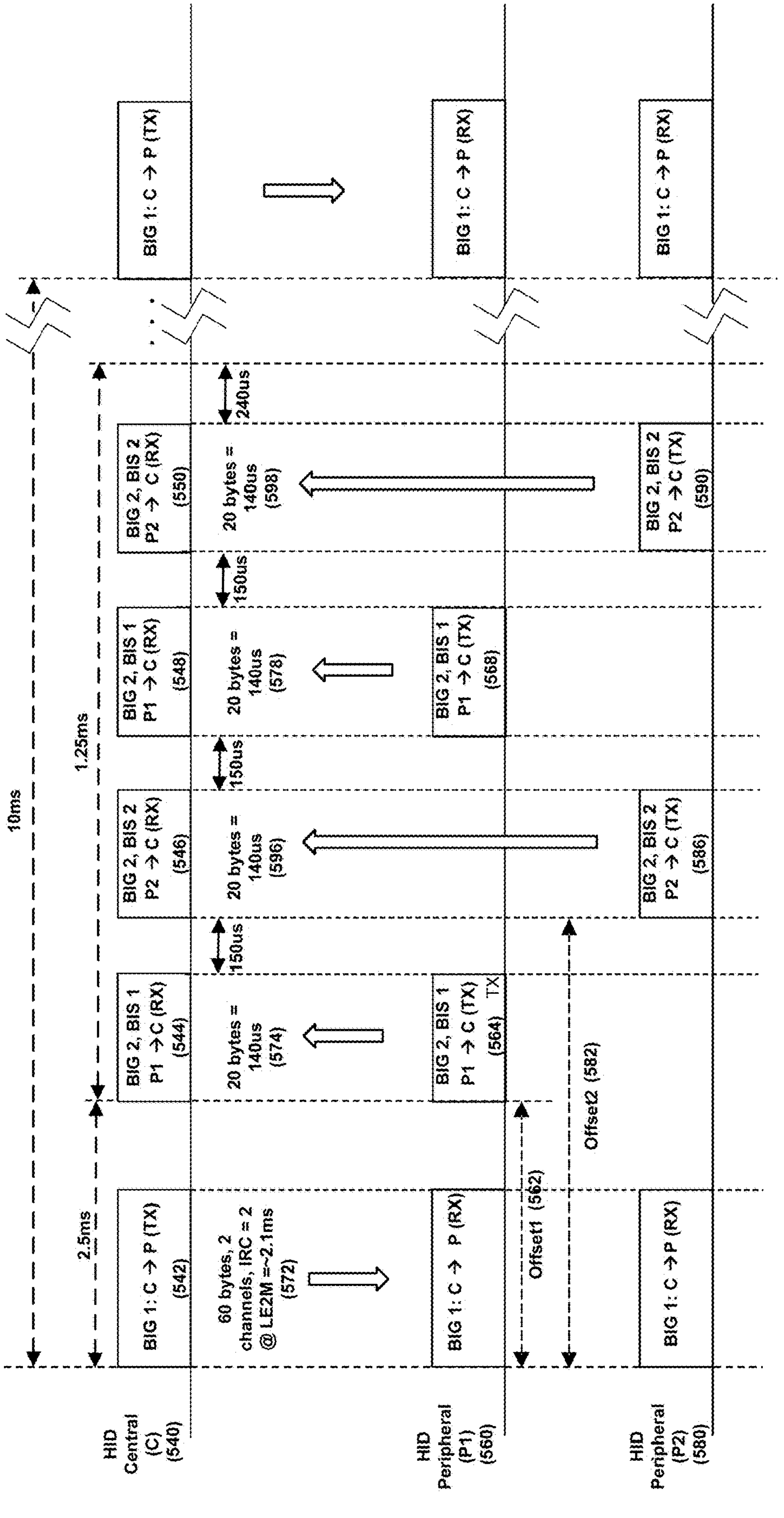
FIG. 5 illustrates an example of using periodic BIG events to broadcast audio data from a central device to two peripheral devices every 10 ms and using BIS events of a second BIG to collectively transmit data from the peripheral devices to the central device during the remaining air-time of the 10 ms interval to achieve low-latency peripheral to-central communication in accordance with one aspect of the present disclosure.

FIG. 5 illustrates an example of using periodic BIG events to broadcast audio data from a central device 540 to two peripheral devices 560/580 every 10 ms and using BIS events of a second BIG to collectively transmit data from the peripheral devices 560/580 to the central device 540 during the remaining air-time of the 10 ms interval to achieve low-latency peripheral to-central communication in accordance with one aspect of the present disclosure. The parameters for the data bandwidth are 60 bytes of stereo LC3 coded central-to-peripheral broadcast every 10 ms and 20 bytes of peripheral-to-central data with as low a latency as possible.

At the start of the 10 ms period, the central device 540 may broadcast a BIS 572 of 60 bytes of stereo LC3 coded data with one redundant transmission in a BIG1 event 542. The BIG1 event 542 at a LE2M bit rate may have a duration of about 2.1 ms including control subevent. Peripheral device HID peripheral P1 (560) may receive BIS 572 to synchronize its timing to the central device 540 and to infer an offset (offset1 (562)) from the start of the BIG1 event 542 when it is instructed to start its peripheral-to-central transmission. Similarly, HID peripheral P2 (580) may receive BIS 572 to synchronize its timing to the central device 540 and to infer an offset (offset2 (582)) from the start of the BIG1 event 542 when it is instructed to start its peripheral-to-central transmission.

The BIG2 subevents from the peripherals may be similar to those of FIG. 4. At offset1 (562) from the start of the BIG1 event 542, HID peripheral P1 (560) may broadcast BIS1 (564) to transmit a first packet 574 of 20 bytes. The BIS1 (564) may have a duration of about 140 uS. The central device 540 may receive BIS1 (564) during sub-interval 544 of BIG2. At offset2 (582) from the start of the BIG1 event 542, HID peripheral P2 (580) may broadcast BIS2 (586) to transmit a first packet 596 of 20 bytes. The BIS2 (586) may also have a duration of about 140 uS. The central device 540 may receive BIS2 (586) during sub-interval 546 of BIG2. The peripheral devices 560/580 may interleave additional BISes 568 and 590 to transmit packets 578 and 598 during sub-intervals 548 and 550, respectively, so each peripheral device has opportunities to transmit two packets almost every 1.25 ms as in FIG. 4. The 1.25 ms cycle of BIG2 may repeat for the remainder of the 10 ms period.

The expected latency for a peripheral device may be expected to be half of the duration of the two consecutive BIS transmissions of BIG2. Averaging the expected latency over the 10 ms period of the BIG1/BIG2 events, the average peripheral-to-central latency may be about 0.7 ms, still well within the target latency of 1 ms.

Figure 6:
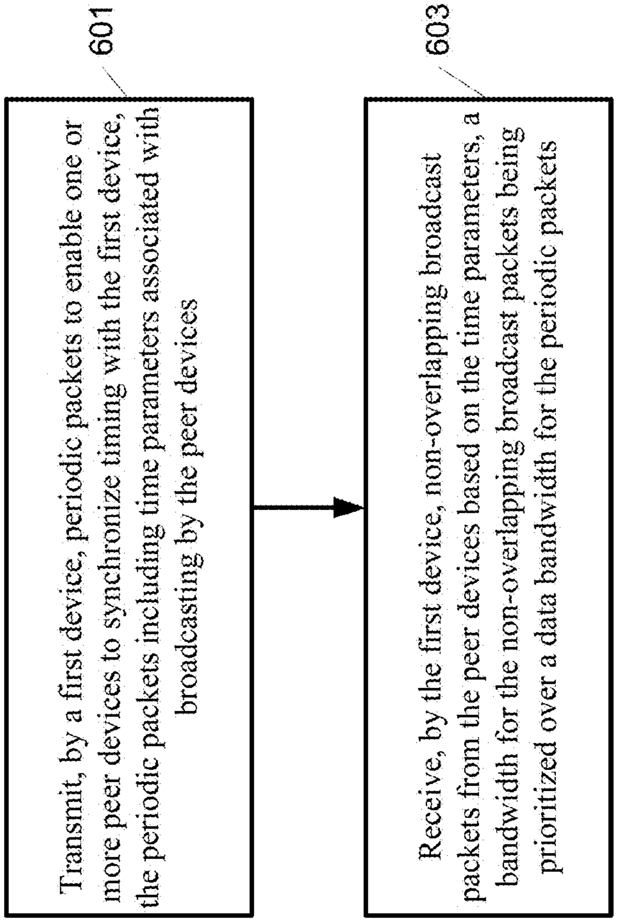
FIG. 6 illustrates a flow diagram of a method for a central device to transmit periodic packets to peripheral devices to synchronize and configure the peripheral devices to collectively broadcast non-overlapping data back to the central device in accordance with one aspect of the present disclosure.

FIG. 6 illustrates a flow diagram of a method 600 for a central device to transmit periodic packets to peripheral devices to synchronize and configure the peripheral devices to collectively broadcast non-overlapping data back to the central device in accordance with one aspect of the present disclosure. In one aspect, the method 600 may be performed by the host and the controller of a BLE system utilizing hardware, software, or combinations of hardware and software.

In operation 601, a first device transmits periodic packets to enable one or more peer devices to synchronize timing with the first device. The periodic packets includes time parameters associated with broadcasting by the peer devices. In one aspect, the periodic packets may contain profile messaging to configure packet sizes and parameterized sub-intervals of transmissions from the peer devices to the first device. The periodic packets may be used by the peer devices to infer one or more fixed offsets from the periodic packets for the start of the transmissions from the peer devise to the first device.

In operation 603, the first device receives non-overlapping broadcast packets from the peer devices based on the time parameters. A bandwidth for the non-overlapping broadcast packets from the peer devices is prioritized over a data bandwidth for the periodic packets from the first device based on the time parameters. In one aspect, the air-time for the non-overlapping broadcast transmission from the peer devices is prioritized over the air-time for the periodic packet transmission from the first device.

Figure 7:
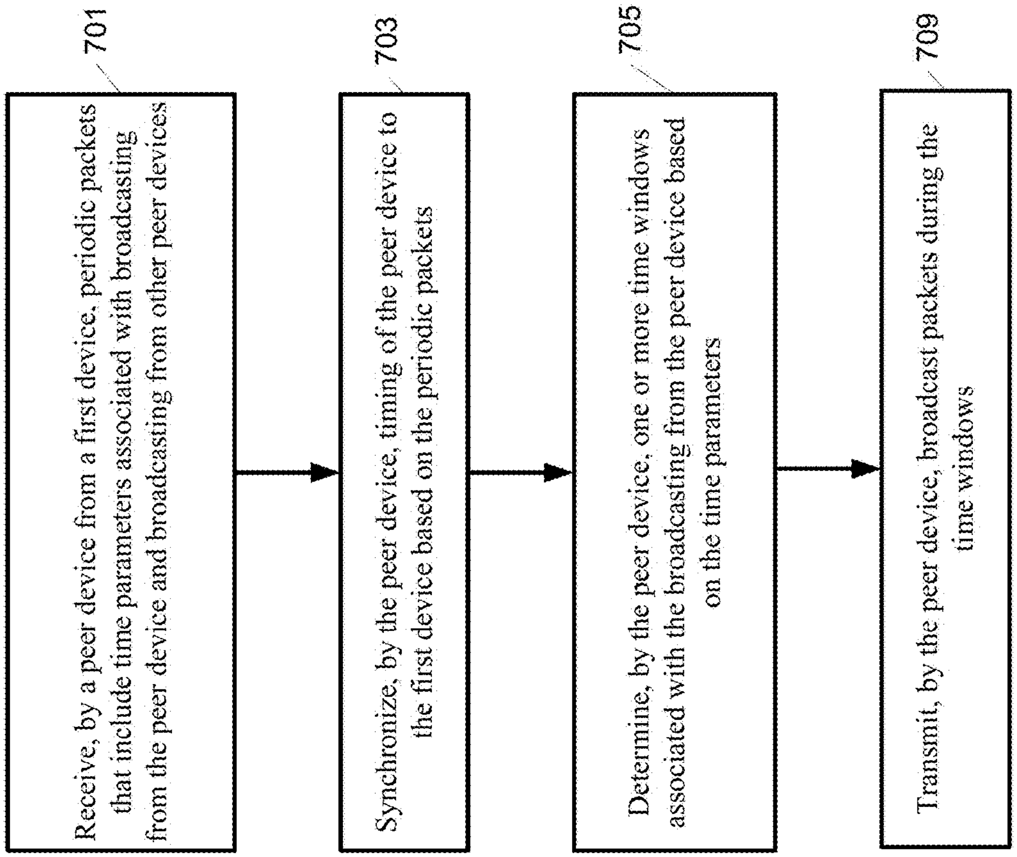
FIG. 7 illustrates a flow diagram of a method for a peripheral device to receive periodic packets from a central device to synchronize in time with the central device and to broadcast data back to the central device in windows configured by the periodic packets in accordance with one aspect of the present disclosure.

FIG. 7 illustrates a flow diagram of a method 700 for a peripheral device to receive periodic packets from a central device to synchronize in time with the central device and to broadcast data back to the central device in windows configured by the periodic packets in accordance with one aspect of the present disclosure. In one aspect, the method 700 may be performed by the host and the controller of a BLE system utilizing hardware, software, or combinations of hardware and software.

In operation 701, a peer device receives from a first device periodic packets that include time parameters associated with broadcasting from the peer device and broadcasting from other peer devices. In one aspect, the periodic packets may contain profile messaging to configure packet sizes and parameterized sub-intervals of broadcast transmissions from the peer and from other peer devices to the first device.

In operation 703, the peer device synchronizes the timing of the peer device to the first device based on the periodic packets. In one aspect, after timing synchronization based on the periodic packets, the peer device may maintain a clock drift of less than 50 ppm to prevent excessive time misalignment between the peer device and the first device during the broadcasting.

In operation 705, the peer device determines one or more time windows associated with the broadcasting from the peer device based on the time parameters. In one aspect, the peer device may infer one or more fixed offsets from the periodic packets for the start of the broadcast transmissions from the peer devise to the first device.

In operation 709, the peer device transmits broadcast packets during the one or more time windows. In one aspect, the time windows for the broadcast transmissions from the peer device and from the other peer devices do not overlap. In one aspect, the broadcast transmissions from the peer device and from the other peer devices are aggregated or coalesced to form a broadcast isochronous group in a reverse many-to-one broadcast from the peer devices to the first device.

Various embodiments of the techniques for BLE devices to use existing BLE broadcast-based signaling protocols to achieve low peripheral-to-central latency described herein may include various operations. These operations may be performed and/or controlled by hardware components, digital hardware and/or firmware/programmable registers (e.g., as implemented in computer-readable medium), and/or combinations thereof. The methods and illustrative examples described herein are not inherently related to any particular device or other apparatus. Various systems (e.g., such as a wireless device including an antenna, a radio frequency (RF) transceiver, a controller operating in a near field environment, pico area network, wide area network, etc.) may be used in accordance with the teachings described herein, or it may prove convenient to construct more specialized apparatus to perform the required method steps. The required structure for a variety of these systems will appear as set forth in the description above.

Figure 8:
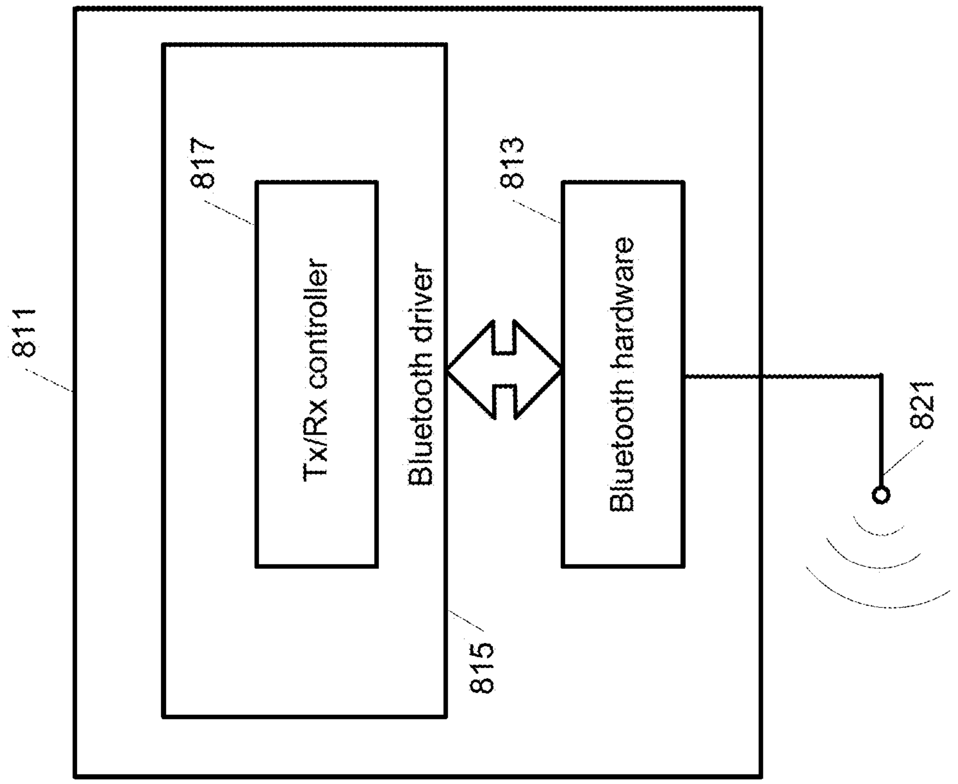
FIG. 8 depicts a block diagram of a Bluetooth device 811 showing hardware and software drivers deployed to operate a BLE link to implement low-latency peripheral-to-central communication in accordance with one aspect of the present disclosure.

FIG. 8 is a block diagram of a Bluetooth device 811 showing hardware and software drivers deployed to operate in a BLE link for connecting with other devices in accordance with one aspect of the present disclosure. The Bluetooth device 811 may practice the protocol of FIGS. 2-5 or the operations of FIGS. 6-7.

The Bluetooth device 811 may include one or more antennas 821, Bluetooth hardware 813 and Bluetooth driver 815. The Bluetooth driver 815 may include Bluetooth Tx/RX controller 817. The Bluetooth hardware 813 may include a RF transceiver configured to transmit broadcast packets or advertising packets on advertising channels, or to transmit or receive BLE packets on an operating channel through the antennas 821. The Bluetooth Tx/RX controller 817 may be configured to generate or decode broadcast packets of the broadcast events or advertising packets of the advertising events in BLE broadcast-based signaling protocols to achieve low peripheral-to-central latency between the Bluetooth device 811 and another device as described herein.

In one embodiment, the Bluetooth device 811 may include a memory and a processing device (e.g., Bluetooth Tx/RX controller 817). The memory may be synchronous dynamic random access memory (DRAM), read-only memory (ROM)), or other types of memory, which may be configured to store the code to perform the function of the Bluetooth driver 815. The processing device may be provided by one or more general-purpose processing devices such as a microprocessor, central processing unit, or the like. In an illustrative example, processing device may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device may also comprise one or more special-purpose processing devices such as an application specific integrated circuit (ASIC), a field programmable gate array (FPGA), a digital signal processor (DSP), network processor, or the like. The processing device may be configured to execute the operations described herein, in accordance with one or more aspects of the present disclosure, for performing the operations and steps discussed herein.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms “a”, “an” and “the” are intended to include the plural forms as well, unless the context clearly indicates otherwise. It will be further understood that the terms “comprises”, “comprising”, “may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of communication between devices of a communication network, comprising:
- transmitting, by a first device, periodic packets to enable one or more peer devices having a first role in a first broadcast isochronous group (BIG) to synchronize timing with the first device, the periodic packets including time parameters associated with broadcasting by the peer devices; and
- receiving, by the first device, non-overlapping broadcast packets from the peer devices having a second role in a second BIG based on the time parameters, a bandwidth for the non-overlapping broadcast packets being prioritized over a data bandwidth for the periodic packets, the second role being different from the first role.

2. The method of claim 1, wherein the time parameters comprise:
- one or more time offsets with respect to a first one of the periodic packets for the peer devices to transmit the non-overlapping broadcast packets before a next one of the periodic packets.

3. The method of claim 2, wherein receiving the non-overlapping broadcast packets comprises:
- receiving, by the first device, a first broadcast packet from a first one of the peer devices at a first time offset with respect to one of the periodic packets; and
- receiving, by the first device, a second broadcast packet from a second one of the peer devices at a second time offset with respect to said periodic packet.

4. The method of claim 1, wherein the time parameters comprise:
- one or more time intervals or packet sizes associated with the non-overlapping broadcast packets from the peer devices.

5. The method of claim 1, wherein receiving the non-overlapping broadcast packets comprises:
- receiving, by the first device, a plurality of broadcast packets from each one of the peer devices, wherein the plurality of broadcast packets from the peer devices are interleaved between two successive instances of the periodic packets.

6. The method of claim 1, wherein the communication network comprises a Bluetooth Low Energy (BLE) wireless network, and wherein the periodic packets comprise a broadcast isochronous stream, a periodic advertising event, or a connected isochronous stream.

7. The method of claim 6, wherein the first device comprises a central device of the BLE wireless network, and wherein the one or more peer devices comprise one or more peripheral devices of the BLE wireless network.

8. The method of claim 1, wherein the first device represents a broadcaster of the first BIG to transmit the periodic packets to the peer devices, and wherein the first device also represents a synchronized receiver of the second BIG to receive the non-overlapping broadcast packets from the peer devices.

9. The method of claim 1, wherein the non-overlapping broadcast packets comprise encrypted broadcast packets.

10. The method of claim 1, further comprising:
- determining the time parameters to adapt the data bandwidth allocated to the non-overlapping broadcasts relative to the data bandwidth allocated to the periodic packets for a plurality of instances of the periodic packets.

11. The method of claim 1, wherein the non-overlapping broadcast packets from a plurality of the peer devices represent multiple-to-one transmissions from a plurality of peripheral devices to a central device of the communication network.

12. A method of communication between devices of a communication network, comprising:

receiving, by a peer device having a first role in a first broadcast isochronous group (BIG) and from a first device, periodic packets that include time parameters associated with broadcasting from the peer device and broadcasting from other peer devices;

synchronizing, by the peer device having a second role in a second BIG, timing of the peer device to the first device based on the periodic packets;

determining, by the peer device, one or more time windows associated with the broadcasting from the peer device based on the time parameters; and transmitting, by the peer device, broadcast packets during the time windows, the second role being different from the first role.

13. The method of claim 12, wherein the time windows comprise:

at least one time offset with respect to a first one of the periodic packets for the peer device to transmit at least one broadcast packet before a next one of the periodic packets; and at least one time interval or a packet size associated with the at least one broadcasts packet.

14. The method of claim 12, wherein the time windows associated with the broadcasting from the peer device are non-overlapping with time windows associated with the broadcasting from the other peer devices, wherein the time windows associated with the broadcasting from the other peer devices are capable of being determined from the time parameters.

15. The method of claim 12, wherein the communication network comprises a Bluetooth Low Energy (BLE) wireless network, and wherein the periodic packets comprise a broadcast isochronous stream, a periodic advertising event, or a connected isochronous stream.

16. The method of claim 15, wherein the first device comprises a central device of the BLE wireless network, and wherein the peer device and the other peer devices comprise peripheral devices of the BLE wireless network.

17. The method of claim 12, wherein the peer device represents a synchronized receiver of the first BIG to receive the periodic packets from the first device, and wherein the peer device also represents one of a plurality of broadcasters of the second BIG to transmit non-overlapping broadcast packets to the first device.

18. The method of claim 17, wherein the time parameters are adapted to prioritize a bandwidth for the non-overlapping broadcast packets from the peer device and from the other peer devices over a data bandwidth for the periodic packets from the central device.

19. The method of claim 12, wherein the broadcast packets comprise encrypted broadcast packets that are non-overlapping with broadcast packets transmitted from the other peer device.

20. An apparatus comprising:

a processing system configured to:

determine, time parameters associated with broadcasting by one or more peer devices to prioritize a bandwidth for the broadcasting by the peer device over a data bandwidth for periodic packets from the apparatus; and a transceiver configured to:

transmit the periodic packets to include the time parameters, the periodic packets enabling the peer devices having a first role in a first broadcast isochronous group (BIG) to synchronize timing with the apparatus; and receive non-overlapping broadcast packets from the peer devices having a second role in a second BIG based on the time parameters, the second role being different from the first role.

* * * * *